(12) United States Patent
Lentini

(10) Patent No.: US 7,917,597 B1
(45) Date of Patent: Mar. 29, 2011

(54) RDMA NETWORK CONFIGURATION USING PERFORMANCE ANALYSIS

(75) Inventor: James Lentini, Woburn, MA (US)

(73) Assignee: NetApp, Inc., Sunnyvale, CA (US)

( * ) Notice: Subject to any disclaimer, the term of this patent is extended or adjusted under 35 U.S.C. 154(b) by 999 days.

(21) Appl. No.: 11/592,732

(22) Filed: Nov. 2, 2006

(51) Int. Cl.
*G06F 15/167* (2006.01)
*G06F 15/16* (2006.01)
*G06F 13/28* (2006.01)
*H04L 12/28* (2006.01)

(52) U.S. Cl. ........ 709/212; 709/213; 709/214; 709/215; 709/216; 709/217; 709/218; 709/219; 709/245; 710/22; 710/26; 370/389

(58) Field of Classification Search .......... 709/212–219, 709/245; 710/22, 26; 370/389
See application file for complete search history.

(56) References Cited

U.S. PATENT DOCUMENTS

| | | | | |
|---|---|---|---|---|
| 6,173,325 | B1 * | 1/2001 | Kukreja | 709/224 |
| 6,675,200 | B1 * | 1/2004 | Cheriton et al. | 709/212 |
| 6,757,255 | B1 * | 6/2004 | Aoki et al. | 370/252 |
| 6,839,896 | B2 | 1/2005 | Coffman et al. | |
| 7,013,419 | B2 | 3/2006 | Kagan et al. | |
| 7,370,082 | B2 * | 5/2008 | Pinkerton | 709/212 |
| 7,624,156 | B1 * | 11/2009 | Hefty et al. | 709/213 |
| 2001/0049740 | A1 | 12/2001 | Karpoff | |
| 2002/0133614 | A1 * | 9/2002 | Weerahandi et al. | 709/237 |
| 2003/0108070 | A1 | 6/2003 | Zaumen et al. | |
| 2004/0225720 | A1 * | 11/2004 | Pinkerton | 709/212 |
| 2005/0144310 | A1 | 6/2005 | Biran et al. | |
| 2006/0031600 | A1 * | 2/2006 | Ellis et al. | 710/22 |
| 2006/0045005 | A1 * | 3/2006 | Blackmore et al. | 370/216 |
| 2006/0045099 | A1 * | 3/2006 | Chang et al. | 370/400 |
| 2006/0075067 | A1 | 4/2006 | Blackmore et al. | |
| 2006/0146814 | A1 * | 7/2006 | Shah et al. | 370/389 |
| 2006/0274748 | A1 * | 12/2006 | Nakashima et al. | 370/389 |
| 2008/0052394 | A1 * | 2/2008 | Bugenhagen et al. | 709/224 |
| 2008/0235409 | A1 * | 9/2008 | Ryzhykh | 710/22 |

FOREIGN PATENT DOCUMENTS

JP 2006042384 A 2/2006
JP 2006042384 A * 2/2006

* cited by examiner

*Primary Examiner* — Nathan Flynn
*Assistant Examiner* — Kai J Chang
(74) *Attorney, Agent, or Firm* — Perkins Coie LLP

(57) ABSTRACT

An embodiment of the invention provides an apparatus and method for performing RDMA (Remote Direct Memory Access) network configuration. The apparatus and method measure a performance of each RDMA operation for different data message sizes and determine an RDMA operation to be applied for a particular packet size sent by an application, based on the measured performance. As an example, the RDMA operations are, e.g., RDMA send/receive, RDMA write, RDMA read, memory registration and memory unregistration, or memory bind and memory unbind. The measured performance can be, for example, the total time to perform an RDMA operation for different packet sizes.

12 Claims, 3 Drawing Sheets

RDMA NETWORK CONFIGURATION USING PERFORMANCE ANALYSIS

TECHNICAL FIELD

Embodiments of the present invention relate generally to computer networks. More particularly, embodiments of the present invention relate generally to RDMA (Remote Direct Memory Access) network configuration using performance analysis.

BACKGROUND

RDMA technology (RDMA protocol) provides a useful method for reducing CPU (processor) workload in the transmission and reception of data across a network and in other network-related processing. Network interface cards that typically implement the RDMA technology can process operations that were previously performed by the CPU. Network interface cards on both the client and the server are typically required to implement the RDMA protocol. RDMA technology is typically used by, for example, commercial data centers that support high performance computing services.

RDMA networks (i.e., networks using the RDMA protocol) such as, for example, the Virtual Interface Architecture (VIA), InfiniBand, and iWARP (Internet Wide Area RDMA Protocol), provide low latency, high bandwidth, and zero-copy communication. Network communications are termed zero-copy when data is transmitted directly from a source memory location to a destination memory location without creating any intermediary copies of the data. RDMA networks provide software applications with three communication primitives (primary operations): (1) RDMA send/receive, (2) RDMA write, and (3) RDMA read. As known to those skilled in the art, each of these three operations has its relative advantages and disadvantages in terms of performance, security, and setup/configuration requirements.

Software applications can use RDMA networks in order to achieve high performance network communication. However, current technology does not provide any methods to automatically configure the behavior of software applications that use RDMA networks in order to maximize the performance of the software application. Therefore, the current technology is limited in its capabilities and suffers from at least the above constraints and deficiencies.

SUMMARY OF EMBODIMENTS OF THE INVENTION

An embodiment of the invention provides an apparatus and method for performing RDMA (Remote Direct Memory Access) network configuration. The apparatus and method measure a performance of each RDMA operation for different data message sizes and determine an RDMA operation to be applied for a particular packet size sent by an application, based on the measured performance. As an example, the RDMA operations are, e.g., RDMA send/receive, RDMA write, RDMA read, memory registration and memory unregistration, or memory bind and memory unbind, as discussed further below. The measured performance can be, for example, the total time to perform an RDMA operation for different packet sizes.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Software applications use RDMA networks in order to achieve high performance network communication. Software applications that use RDMA networks are also referred herein as "RDMA software". To maximize a particular performance metric (e.g., latency, bandwidth, or other metrics), the RDMA software is required to use the RDMA operations intelligently. The RDMA software can use the RDMA operation intelligently by using various elements in a network interface card in a network node, as discussed in additional details below. In an embodiment of the invention, a node 105 in a system 100 includes a network configuration engine 180 that weighs (evaluates) the performance of an RDMA operation against the time required to set up the RDMA operation for a software application 120, as discussed in below. Depending on the message size being transferred in the communication, one RDMA operation type may significantly outperform another RDMA operation type for the software application. Therefore, proper configuration of RDMA operations for the software application is performed to achieve optimal performance, as discussed in additional details the examples below.

Figure 1:
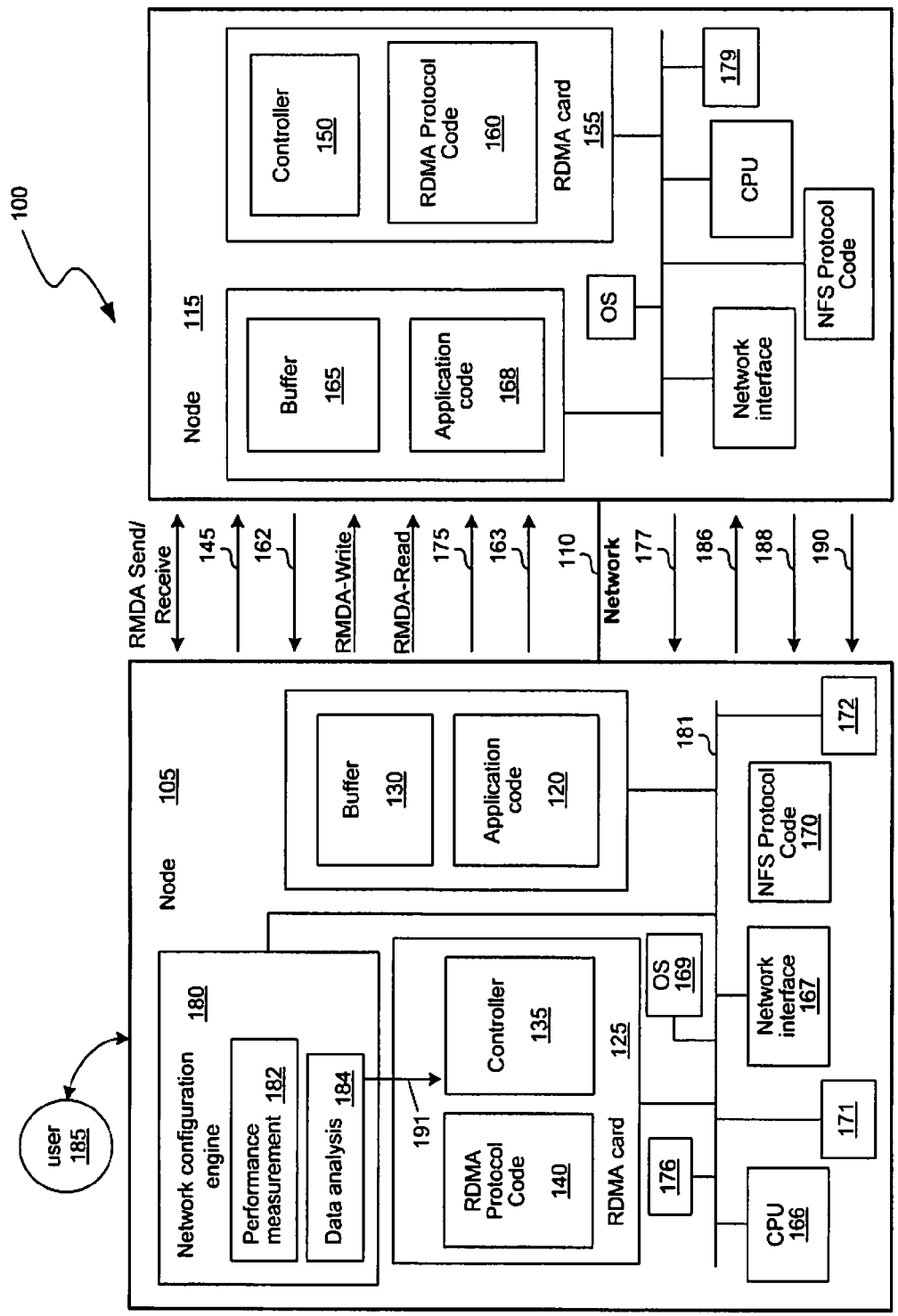
FIG. 1 is a block diagram of an apparatus (system) in accordance with an embodiment of the invention.

FIG. 1 is a block diagram of an apparatus (system) 100 in accordance with an embodiment of the invention. The apparatus 100 includes a first node 105 that is connected by a network 110 to a second node 115. Both of the nodes 105 and 115 can use the RDMA protocol in order to perform RDMA operations. An overview of RDMA operations is first described below, to assist in describing the various details of embodiments of the invention.

RDMA reduces latencies by allowing one computer (or node type) to directly place information in a memory of a second computer (or other node type), with reduced demands on memory bus bandwidth and central processing unit (CPU) processing overhead. At the same time, RDMA provides security to the memories of the computer. The three types of operations currently provided by the RDMA protocol are: RDMA SEND/RECEIVE, RDMA WRITE, and RDMA READ. The details of these operations are described in the below examples.

Before using an RDMA operation, a source memory buffer (to be used in the RDMA operation) must be registered with an RDMA card at the source node and a destination memory buffer must be registered with an RDMA card at the destination node. This registration step permits the RDMA card to select and identify a memory buffer for use in the RDMA operation. The term, RDMA card, may be, for example, a network interface card (or other interface types) that implements the RDMA technology (RDMA protocol). In the memory registration step, the RDMA card (e.g., RDMA card 125) records information pertaining to a memory buffer (e.g., buffer 130) that is being registered. The information that is recorded includes the location of the buffer 130 and the access protection to the buffer 130. The process in the application code 168 executes the memory registration step in order to create a memory handle that uniquely identifies the memory buffer 130 to the RDMA card 125. As known to those skilled in the art, a memory handle is data that identifies a memory. The memory registration step is also performed for registering a buffer 165 to an RDMA card 155 in another node 115.

In an RDMA send/receive operation (shown as RDMA SEND/RECEIVE in FIG. 1), the process in the application code 168 in node 115, for example, allocates and registers the memory buffer 165 with the RDMA card 155. Note that in the discussion herein, for purposes of clarity, when a code or engine is described herein as performing an operation, the process of the code or engine is typically executing or performing the operation. The application code 168 in node 115 then informs the RDMA card 155 that the memory buffer 165 is available to receive data. At some subsequent time, an application code 120 in another node 105 would register a memory buffer 130 with the RDMA card 125 in node 105. Subsequently, the application 120 would inform the RDMA card 125 that the data in the memory buffer 130 should be transmitted across the network 110 to the node 115. A controller 135 in the RDMA card 125 will execute the RDMA protocol code 140 so that the process of the code 140 permits the RDMA card 125 to send the data 145 from the buffer 130 via network 110 to the node 115. When the node 115 receives the data 145, a controller 150 in the RDMA card 155 (in the receiving node 115) executes the RDMA protocol code 160 so that the process of the code 160 permits the RDMA card 155 to store the data 145 into the local memory buffer 165.

For RDMA READ or RDMA WRITE (shown as RDMA-READ and RDMA-WRITE in FIG. 1, respectively), note that the application code 168 in node 115, for example, is first required to send a memory handle message 162 to the RDMA card 125 in node 105 before the node 105 can perform a read from or write operation to the buffer 165 of node 115. The message 162 indicates (advertises) the memory handle (key) for buffer 165, which will be the target of the RDMA READ or RDMA WRITE. After the application code 120 receives and processes the message 162, the application code 120 will then submit an RDMA READ or RDMA WRITE to the RDMA card 125. The RDMA READ (or RDMA WRITE) targets the buffer 165, and the RDMA cards 125 and 155 operate so that data is read from (or written to) the buffer 165. The RDMA card 155 reads the data from the buffer 165 and then transmits the data from node 115 to the node 105. The data to be written to the buffer 165 is transmitted by RDMA card 125 from the node 105 to the node 115 and is then written by RDMA card 155 to the buffer 165. The controllers 135 and 150 in the RDMA cards 125 and 155, respectively, execute processes in the RDMA codes 140 and 160, respectively, in order to perform the described RDMA read, write, or send/receive operations, as described herein.

When the receiving node 115 makes a memory buffer 165 no longer available for remote access by peer nodes (e.g., node 105), then the RDMA card 155 will perform the memory un-registration step. The RDMA card (e.g., RDMA card 125) removes the information pertaining to a memory buffer (e.g., buffer 130) that has been registered. As previously discussed above, the information that has been recorded includes the location of the buffer 130 and the access protection to the buffer 130. As a result of the un-registration step, a peer node (e.g., node 105) will no longer be able to perform accesses (e.g., read or write operations) into the memory buffer 165 in the receiving node 115. This memory un-registration step also imposes performance overhead, since additional time is required to make the memory buffer 165 to be unavailable for remote access (e.g., read or write operations) by peer nodes.

Note further that a second type of memory registration is also known as the memory bind step, where the RDMA card 155, for example, makes a memory buffer space 165 to be available for remote access by a peer node (e.g., node 105) for a limited window of time. When this limited window of time has expired, the RDMA card 155 performs a memory unbind step so that the memory buffer space 165 will no longer available for remote access by peer nodes.

Note further that each of the nodes 105 and 115 also includes known components that are used for network transmission or other operations. For example, the node 105 includes a CPU 166 and operating system 169 for performing management operations for the node 105 and other various software or firmware in the node 105. The node 105 also includes a network interface 167 that transmits and receives the data packets across the network 110. Node 115 may include similar components or software/firmware applications.

Application codes for implementing the known NFS-RDMA and RPC-RDMA protocols (e.g., codes 171 and 172) are typically provided in the network nodes. As known to those skilled in the art, NFS (Network File System) is a protocol that permits devices to communicate with each other via a network. As also known to those skilled in the art, RPC (Remote Procedure Call) is a protocol that one program can use to request a service from a program located in another computer in a network without having to understand network details. The RPC-RDMA protocol is a known ONC-RPC (Open Network Computing-RPC) transport for RDMA networks. As known to those skilled in the art, ONC-RPC is a known widely deployed remote procedure call system. ONC is based on calling conventions used in Unix and the C programming language and serializes data using the XDR (eXternal Data Representation) encoding/decoding which allows data to be wrapped in an architecture independent manner so the data can be transferred between heterogeneous computer systems. ONC then delivers the XDR payload using either UDP (User Datagram Protocol) or TCP (Transmission Control Protocol). Access to RPC services on a machine are provided via a port mapper that listens for queries on a well-known port (known in the art as port 111), over UDP and TCP. ONC-RPC is described in RFC 1831, which is hereby fully incorporated herein by reference.

The RPC-RDMA protocol is discussed in further detail in, for example, "RDMA Transport for ONC RPC", Internet Draft, June 2006 at <www.ietf.org>, which is hereby fully incorporated herein by reference. The RPC-RDMA protocol is a client-server protocol in which the client issues RPC requests and the server responds with RPC replies. The RPC-RDMA protocol can transfer an RPC request via either in an RDMA send operation or an RDMA send operation followed by some number of RDMA READ operations. Similarly, an RPC reply (in response to the RPC request) can be transferred via either in an RDMA send operation or some number of RDMA WRITE operations followed by an RDMA send. Note that the RDMA send operation advertises a buffer and an example RDMA send was denoted as signal 162 or signal 163 above, depending on the node that is sending the buffer advertisement.

The NFS protocol 170, which is the Network File System protocol, can use the RPC-RDMA protocol for ONC-RPC as a transport protocol (protocol on the transport layer). As known to those skilled in the art, when the NFS protocol uses the RPC-RDMA protocol (hereinafter referred to as "NFS-RDMA environment"), then data can be transferred from a local node (e.g., node 105) to a remote node (e.g., node 115) by use of the RDMA send/receive operation, or by use of the RDMA read operation or RDMA write operation.

Since RDMA read and RDMA write operations permit local nodes to access memory areas in the remote nodes, the local nodes can potentially corrupt the memory areas of the remote nodes, either maliciously or accidentally (e.g., from a software bug). To prevent corruption of an NFS server's (remote node) memory areas (where an NFS server is defined as a server that operates the NFS protocol), the NFS-RDMA environment may be configured to only allow the NFS server node to perform an RDMA read/write operation and not permit an NFS client node to perform an RDMA read/write operation. The NFS client node also operates the NFS protocol. For purposes of clarity in the below example, the remaining discussion will assume that the above restriction is in effect, although embodiments of the invention can be implemented with the above restriction. An RPC request from a client node 105 can either go to the server node 115 in a single RDMA send, or go in an RDMA send and multiple RDMA reads. Also, it is assumed, for example, that the node 105 is an NFS client node 105 and the node 115 is an NFS server node 115, although the nodes 105 and 115 can be modified to operate other types of suitable file systems as well.

In an NFS-RDMA environment when the NFS client node 105 wishes to write the data 175 to the NFS server node 115, there are two options: (1) the NFS client node 105 may send the write data 175 to the NFS server node 115 or (2) the NFS server node 115 may read (pull) the write data 175 from the memory (buffer) 130 of the NFS client node 105 to the memory (buffer) 165 of the NFS server node 115. If option (1) is chosen, the NFS client 105 either: (i) must copy the write data 175 from the operating system memory buffer 176 into a pre-registered memory buffer 130 (where the buffer 176 had been previously registered with the RDMA card 125) or (ii) register the operating system memory buffer 176 with the RDMA card 125. The known process of memory buffer registration was previously described above. The NFS client 105 would transfer the write data 175 to the NFS server 115 via an RDMA SEND operation. If option (2) is chosen, the NFS client 105 must register, with the RDMA card 125, the operating system memory buffer 176 containing the data 175 to be written. In this case, the NFS client 105 would transfer the memory handle of the memory buffer 176 (containing the write data) to the NFS server 115 in an RDMA SEND operation (e.g., by use of an advertisement 163). The NFS server 115 would then pull the write data 175 from the memory buffer 176 of NFS client node 105 to the memory buffer 165 of the NFS server 115 via some number of RDMA READ operations from the server node 115 to the client node 105.

In an NFS-RDMA environment when the NFS client node 105 wishes to read the data 177 from the NFS server node 115, there are two options: (1) the NFS server node 115 may send the read data 177 to the NFS client node 105, or (2) the NFS server node 115 will write (push) the read data 177 to the memory buffer 130 of the NFS client node 105. If option (1) is chosen, the NFS server 115 either: (i) must copy the read data 177 from the operating system memory buffer 179 containing the data 177 being read into a pre-registered memory buffer 165 (where the buffer 165 had been previously registered) or (ii) register the operating system memory buffer 179 with the RDMA card 155. The NFS server 115 would then transfer the read data 177 to the NFS client node 105 via an RDMA SEND operation. If option (2) is chosen, the NFS client node 115 must register, with the RDMA card 125, the operating system memory buffer 176 into which the read data 177 will be stored. In this case, NFS client node 105 would transfer the memory handle of the buffer 176 to the NFS server 115 in an RDMA SEND operation (e.g., via advertisement 163). The NFS server 115 would then push the read data 177 from the memory buffer 165 of NFS server 115 to the memory buffer 176 of NFS client node 105 via some number of RDMA WRITE operations from the server 115 to the client node 105.

For both an NFS read operation and NFS write operation as described above, the NFS code 170 must decide to either copy data into and out of pre-registered buffers (as identified above) or register the buffers dynamically (register the buffers in real time). The performance overhead of the copy operation (into and out of the pre-registered buffers) varies depending on the amount of memory data to be copied. The time necessary to register a memory or buffer with the RDMA card 125 is dominated by the time needed for communications over the peripheral bus 181 between the RDMA card 125 and buffer to be registered. If the amount of memory data being transmitted is relatively small, then the time needed to copy the data to and from the pre-registered buffers (buffers 130 and 165) will be less than the time needed to register the memory or buffer (buffers 176 or 179). On the other hand, if the amount of memory data being transmitted is relatively large, then the amount of time necessary to register the memory or buffer (buffers 176 or 179) will be less than the time needed to copy the data to and from the pre-registered buffers (buffers 130 and 165).

In accordance with embodiment of the invention, a network configuration engine 180 will measure the performance of RDMA operations, analyze the results, and automatically configure the behavior of an application 120 to perform optimally when using the RDMA protocol 140. Therefore, an embodiment of the invention solves the problem of how to configure the behavior of software applications that use RDMA networks in order to maximize the performance of these software applications.

The network configuration engine 180 can be implemented in a suitable programming language such as, for example, C, C++, C#, or other suitable languages. Standard programming techniques may be used to implement the functionalities of the network configuration engine 180.

Embodiments of the network configuration engine 180 can be implemented as a stand alone component or as part of a larger piece of software, or by other suitable configurations. In any implementation, an embodiment of the invention provides two primary functional units: (1) performance measurement which is performed by a process of the performance measurement module 182, and (2) data (performance) analysis as performed by a process of the data analysis module 184. For purposes of clarity, the modules are described below as performing the steps that are actually performed by the processes in the modules 182 or 184.

In the first phase, the performance measurement module 182 (of engine 180) probes the performance of the RDMA network. Specifically, the performance measurement module 182 systematically tests the performance of each RDMA operation for different data message sizes. The RDMA operations include RDMA send/receive, RDMA write, RDMA read, memory registration and memory un-registration, or memory bind and memory unbind. These RDMA operations have been previously described above for background purposes. A user 185 may be able to specify the initial message size (packet size), the amount that the message size is incremented for each iteration, and the number of iterations, as discussed in an example below. Additionally or alternatively, the performance measurement module 182 can automatically set/select the initial message size, the amount that the message size is incremented for each iteration, and the number of iterations, and these settings can be automatically varied to different sets of values. Smaller increment amounts and a larger number of iterations will, in general, improve the accuracy of the performance analysis step which is subsequently performed.

As an example, the performance measurement module 182 will measure the amount of total time that is required to perform the steps of memory registration and RDMA send/receive, for data packets (e.g., data 186) of, 10 kilobytes, 20 kilobytes, 40 kilobytes, 80 kilobytes, and 160 kilobytes. The number of packets (iterations) and increments in packet sizes (size increments) each may vary in other examples. The performance measurement module 182 triggers a particular application code 120 to send the data packets 186 in the iterations and size increments as noted above. In this example, the application code 120 is a RDMA verbs API (Application Program Interface). The application code 120 can be other suitable types of applications as well. The performance measurement module 182 transmits the packets 186 using the appropriate known RDMA verbs API functions. In this particular example, the size increment for each iteration is twice the size of the previous packet size, although other size increments and other variations can be used as well in other examples. The number of iterations in this example is set to 5 iterations, although in practice the number of iterations is typically higher and the number of iterations may vary as well in other examples. The performance measurement module 182 will measure a total time for performing the steps of memory registration and RDMA send/receive, for each packet size. Assume that the performance measurement module 182 determines that the total time versus packet sizes measurements is represented by the line 205 in FIG. 2. As an example, assume that the performance measurement module 182 has determined that the line 205 is represented by the equation y=x, although other implementations of the system 100 and/or application 120 may result in the line 205 to be represented by other equations. The performance measurement module 182 can determine the appropriate equations by use of known mathematical techniques for determining equations based on a set of measured values.

The performance measurement module 182 can determine the total time to perform the steps of memory registration and RDMA send/receive operations by measuring the time difference between an initial request to register a memory buffer (e.g. buffer 130) with RDMA card 135 of the local node 105 to the acknowledgement 188 from RDMA card 155 that a data message 186 arrived at its destination. These time differences (values) are measured for various packet sizes as previously noted above. Also, the module 180 typically detects the arrival of the acknowledgement 188 in the node 105 when the network interface 167 receives the acknowledgement 188.

Assume further in this example that the performance measurement module 182 will measure the amount of total time that is required to perform the steps of memory registration and RDMA write for data packets of, 10 kilobytes, 20 kilobytes, 40 kilobytes, 80 kilobytes, and 160 kilobytes or other packet sizes. In this example, the size increment for each iteration is twice the size of the previous packet size, although other size increments can be used as well in other examples. The number of iterations in this example is set to 5 iterations, although in practice the number of iterations is higher and the number of iterations may vary as well in other examples. The performance measurement module 182 will measure a total time for performing the step RDMA write for each packet size. Assume that the performance measurement module 182 determines that the total time versus packet sizes measurements is represented by the line 210 in FIG. 2. Although in this example, the line 210 represents a total time versus packet sizes for memory registration and an RDMA write operation, this line 210 could represent a total time versus packet sizes for memory registration and an RDMA read operation as well. As an example, assume that the performance measurement module 182 has determined that the line 210 is represented by the equation y=(x/2)+40, although other implementations of the system 100 and/or application 120 may result in the line 210 to be represented by other equations. Therefore, in other examples, the line 205 and line 210 can have other shapes and positions in the graph 200.

The performance measurement module 182 can determine the total time to perform the RDMA write (or RDMA read) operation by measuring the time difference between the RDMA-WRITE (FIG. 1) write message and the confirmation message 190 from the remote node 115, where the confirmation message 190 indicates the completion of the RDMA write step and is received by the network interface 167.

In the second phase, the data analysis module 184 (in engine 180) performs the performance analysis step. In this second phase, the data analysis module 184 compares the performance overhead of setting up and executing the operation of RDMA send/receive versus RDMA write, or RDMA send/receive versus RDMA read. Based on these comparisons, the data analysis 184 automatically determines and recommends the RDMA settings to use in order to achieve the maximum possible performance for an application 120. Using an RPC request as an example (RPC requests and RPC replies were discussed above), in an RPC-RDMA implementation, the data analysis module 184 decides if the time needed to execute an RDMA send/receive (which includes registering the data buffer 130 and performing the RDMA send/receive steps, and un-registering the data buffer 130) is less than or equal to the time needed to setup an RDMA read (which includes registering the data buffer 130, performing the RDMA send step (signal 163 in FIG. 1) to advertise the buffer 130 to the remote node 115, performing the RDMA read of the buffer 130 by the remote node 115, and un-registering the data buffer 130). A similar comparison can be performed by the software application 120 for an RPC reply data. Other transfer options, such as copying the data into a pre-registered buffer 130, can be evaluated using the above technique.

Figure 2:
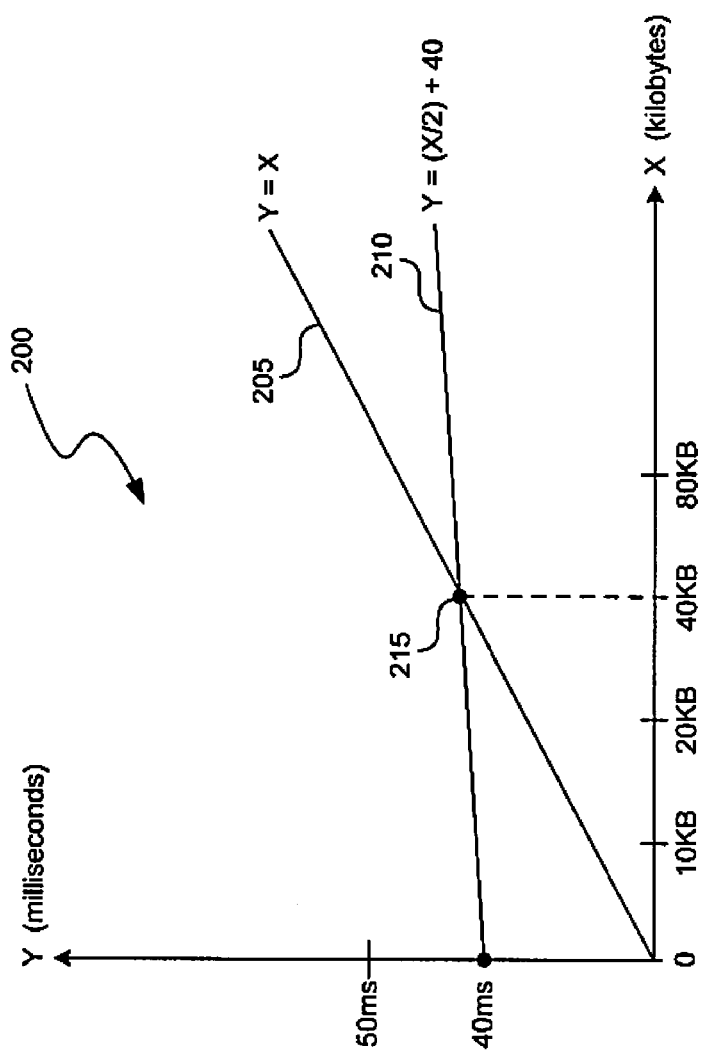
FIG. 2 is a diagram illustrating an operation of an apparatus (system) in accordance with an embodiment of the invention.

In an example graph 200 of FIG. 2, the lines 205 and 210 intersects at the point 215 which has (x,y) coordinates of, for example, (40 KB, 50 MS). As shown in the graph 200, for data sizes less than 40 kilobytes, the total time for the RDMA send/receive operation is less than the total time for the RDMA write operation (or RDMA read operation in another example). The total time values are shown on the Y axis for each equation 205 and 210. Therefore, the data analysis module 184 will recommend to the user 185 that the user 185 selects the RDMA send/receive operation for data sizes less than 40 kilobytes to be sent by the application 120 to node 115. Alternatively or additionally, the data analysis module 184 automatically sets the RDMA card 125 to select the RDMA write operation (or RDMA read operation in another example) for data sizes greater than 40 kilobytes. The data analysis module 184 sends a select signal 191 to the application code 120 so that the application 120 will select the RDMA send/receive operation for transmitting data sizes less than 40 kilobytes. The controller 135 operates with the application code 120 to select the appropriate RDMA operation and to perform switching operations from one RDMA operation to another RDMA operation.

As shown in the graph 200, for data sizes greater than 40 kilobytes, the total time for the RDMA write operation (or RDMA read operation in another example) is less than the total time for the RDMA send/receive operation. Therefore, the data analysis module 184 will recommend to the user 185 that the user 185 selects the RDMA write (or RDMA read operation in another example) for data sizes greater than 40 kilobytes to be sent by application 120 to node 115. Alternatively or additionally, the data analysis module 184 automatically sets the RDMA card 125 to select the RDMA send/receive operation for data sizes less than 40 kilobytes to be sent by application 120 to node 115. The data analysis module 184 sends a select signal 191 to the application code 120 so that the application 120 will select the RDMA write (or RDMA read operation in another example) for transmitting data sizes greater than 40 kilobytes.

For data sizes at the threshold point of 40 kilobytes (point 215), the data analysis module 184 can automatically select, for an application 120, either the RDMA send/receive operation, or the RDMA write operation (or RDMA read operation in other examples).

The possible advantages of embodiments of the invention are that the RDMA configuration parameters can be determined automatically in order to achieve the maximum possible performance in the network. Since the network configuration engine 180 conducts the performance analysis on an application 120, the RDMA settings applied to application 120 will be as accurate as possible in order to achieve the maximum possible performance. Therefore, the network configuration engine 180 can configure the RPC-RDMA implementation properly so that various comparisons can be evaluated and optimal configuration parameters can be set for an application 120.

Figure 3:
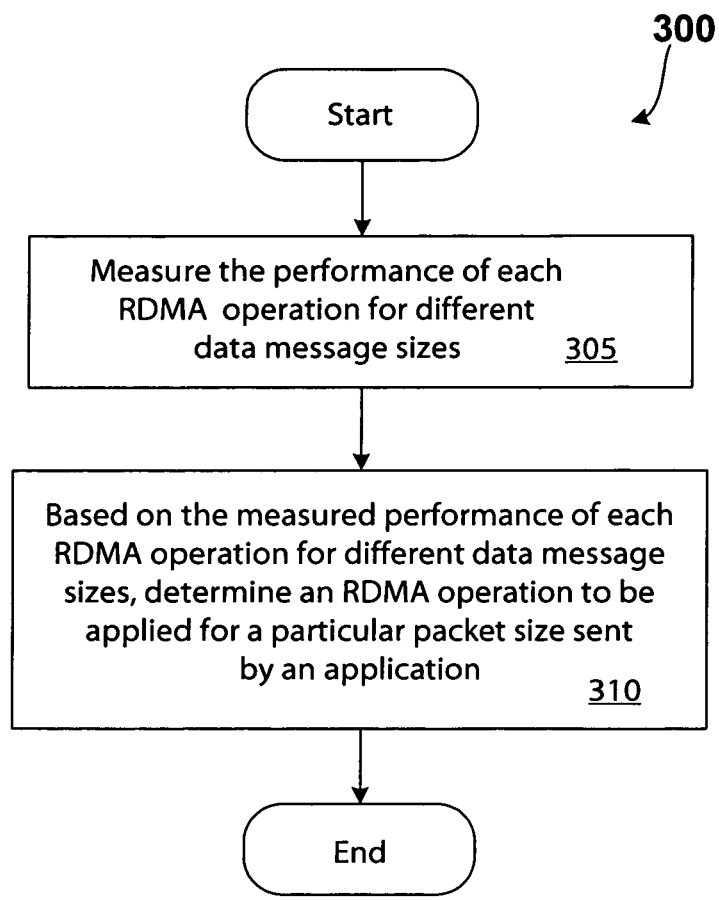
FIG. 3 is a flow diagram illustrating a method in accordance with an embodiment of the invention.

FIG. 3 is a flow diagram illustrating a method 300 in accordance with an embodiment of the invention. In step 305, the performance measurement module 182 (FIG. 1) systematically measures the performance of each RDMA operation for different data message sizes. The RDMA operations includes RDMA send/receive, RDMA write, RDMA read, memory registration/un-registration, and memory bind/unbind, as previously described above. In an embodiment of the invention, the total time to perform an RDMA operation is measured for different packet sizes.

In step 310, based on the measured performance of each RDMA operation for different data message sizes as performed in step 305, an RDMA operation to be applied for a particular packet size sent by an application (e.g., application 120) is determined. For example, based on the measured performances, packet sizes under approximately 40 kilobytes will be transmitted by use of the RDMA send/receive operation, and packet sizes at or over approximately 40 kilobytes will be transmitted by use of RDMA write operation (or RDMA read operation in another example).

It is also within the scope of an embodiment of the present invention to implement a program or code that can be stored in a machine-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for performing RDMA (Remote Direct Memory Access) network configuration, the method comprising:
   measuring a time to perform each of a plurality of types of RDMA operations for different data message sizes between a first network node and a second network node;
   generating a function that represents a performance of each of the plurality of types of RDMA operations for different data message sizes, to generate a plurality of functions corresponding to the plurality of types of RDMA operations, wherein the performance is based on the time to perform each of the plurality of types of RDMA operations;
   determining a threshold data message size, based on an intersection of at least two of the plurality of functions; and
   determining an RDMA operation to be applied for a data message to be sent by an application, based on a size of the data message and the threshold data message size, wherein a first RDMA operation is selected for data message sizes under the threshold data message size and a second RDMA operation is selected for data message sizes over the threshold data message size.

2. The method of claim 1 wherein the plurality of RDMA operations comprises at least one of: RDMA send/receive, RDMA write, RDMA read, memory registration and memory un-registration, or memory bind and memory unbind.

3. The method of claim 1, wherein the different data message sizes are selected by selecting an initial size, an amount that the size is incremented for each iteration, and a number of iterations.

4. The method of claim 1, wherein a first RDMA operation or a second RDMA operation is selected for data messages sizes at the threshold data message size.

5. An apparatus for performing RDMA (Remote Direct Memory Access) network configuration, the apparatus comprising:
   a performance measurement module configured to measure a time to perform each of a plurality of types of RDMA operations for different data message sizes between a first network node and a second network node; and
   a data analysis module configured to generate a function that represents a performance of each of the plurality of types of RDMA operations for different data message sizes, to generate a plurality of functions corresponding to the plurality of types of RDMA operations wherein the performance is based on the time to perform each of the plurality of types of RDMA operations, to determine a threshold data message size, based on an intersection of at least two of the plurality of functions, and to determine an RDMA operation to be applied for a data message to be sent by an application, based on a size of the data message and the threshold data message size, wherein a first RDMA operation is selected for data message sizes under the threshold data message size and a second RDMA operation is selected for data message sizes over the threshold data message size.

6. The apparatus of claim 5 wherein the plurality of RDMA operations comprises at least one of: RDMA send/receive, RDMA write, RDMA read, memory registration and memory un-registration, or memory bind and memory unbind.

7. The apparatus of claim 5 wherein the performance measurement module selects the different data message sizes by selecting an initial size, an amount that the size is incremented for each iteration, and the number of iterations.

8. The apparatus of claim 5, wherein a first RDMA operation or a second RDMA operation is selected for data message sizes at the threshold data message size.

9. The apparatus of claim 5, further comprising:
a network configuration engine that includes the performance measurement module and the data analysis module.

10. The apparatus of claim 9, wherein the network configuration engine is included in a node.

11. The apparatus of claim 5, wherein the RDMA operation is performed from a first node via a network to a second node.

12. An article of manufacture, comprising:
a non-transitory machine-readable medium having stored thereon instructions which configure a machine to:
measure a time to perform each of a plurality of types of RDMA operations for different data message sizes;
generate a function that represents a performance of each of the plurality of types of RDMA operations for different data message sizes, generate a plurality of functions corresponding to the plurality of types of RDMA operations wherein the performance is based on the time to perform each of the plurality of types of RDMA operations for different data message sizes;
determine a threshold data message size, based on an intersection of at least two of the plurality of functions; and
determine an RDMA operation to be applied for a data message to be sent by an application based on a size of the message and the threshold data message size, wherein a first RDMA operation is selected for data message sizes under the threshold data message size and a second RDMA operation is selected for data message sizes over the threshold data message size.

* * * * *